(12) United States Patent
Yu et al.

(10) Patent No.: US 12,245,084 B2
(45) Date of Patent: Mar. 4, 2025

(54) METHOD AND APPARATUS FOR PRE-EMPTION OF A SIDELINK RESOURCE

(71) Applicant: LENOVO (BEIJING) LIMITED, Beijing (CN)

(72) Inventors: Xiaodong Yu, Beijing (CN); Zhennian Sun, Beijing (CN); Haipeng Lei, Beijing (CN); Lianhai Wu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 529 days.

(21) Appl. No.: 17/421,942

(22) PCT Filed: Jan. 10, 2019

(86) PCT No.: PCT/CN2019/071195
§ 371 (c)(1),
(2) Date: Jul. 9, 2021

(87) PCT Pub. No.: WO2020/142990
PCT Pub. Date: Jul. 16, 2020

(65) Prior Publication Data
US 2022/0124562 A1    Apr. 21, 2022

(51) Int. Cl.
*H04W 28/26*    (2009.01)
*H04W 72/20*    (2023.01)
*H04W 4/40*    (2018.01)

(52) U.S. Cl.
CPC ........... *H04W 28/26* (2013.01); *H04W 72/20* (2023.01); *H04W 4/40* (2018.02)

(58) Field of Classification Search
CPC ....... H04W 28/26; H04W 72/20; H04W 4/40; H04W 72/56
See application file for complete search history.

(56) References Cited

U.S. PATENT DOCUMENTS

| | | | | |
|---|---|---|---|---|
| 10,743,293 | B2 * | 8/2020 | Rudolf | H04W 72/569 |
| 11,012,980 | B2 * | 5/2021 | Rudolf | H04L 12/1863 |
| 2017/0041902 | A1 * | 2/2017 | Sheng | H04W 72/02 |
| 2017/0230939 | A1 * | 8/2017 | Rudolf | H04W 72/04 |
| 2018/0042023 | A1 | 2/2018 | Sheng | |
| 2018/0234994 | A1 * | 8/2018 | Yasukawa | H04W 4/70 |
| 2018/0368110 | A1 * | 12/2018 | Ying | H04L 1/0075 |
| 2019/0327757 | A1 * | 10/2019 | Oteri | H04L 5/0053 |
| 2020/0037343 | A1 * | 1/2020 | He | H04W 72/20 |
| 2020/0196339 | A1 * | 6/2020 | Jung | H04W 72/56 |

(Continued)

FOREIGN PATENT DOCUMENTS

CN    108141847 A    6/2018

OTHER PUBLICATIONS

He et al. U.S. Appl. No. 62/732,368, filed Sep. 17, 2018 (Year: 2018).*
He et al. U.S. Appl. No. 62/737,408, filed Sep. 27, 2018 (Year: 2018).*
He et al. U.S. Appl. No. 62/787,854, filed Jan. 3, 2019 (Year: 2019).*

(Continued)

*Primary Examiner* — Wutchung Chu
(74) *Attorney, Agent, or Firm* — Kunzler Bean & Adamson

(57) ABSTRACT

The subject application is related to method and apparatus for scheduling a sidelink resource. A method performed by a first user equipment (UE), comprising: determining a reserved resource; transmitting a signal indicating the reserved resource; and if a pre-emption indication is received, releasing the reserved resource to a second UE.

18 Claims, 15 Drawing Sheets

(56) References Cited

U.S. PATENT DOCUMENTS

| | | | |
|---|---|---|---|
| 2020/0205173 A1* | 6/2020 | Frederiksen | H04L 1/1854 |
| 2021/0212086 A1* | 7/2021 | Li | H04L 1/1812 |
| 2021/0219268 A1* | 7/2021 | Li | H04B 17/318 |
| 2021/0227508 A1* | 7/2021 | Lee | H04W 72/02 |
| 2021/0243749 A1* | 8/2021 | Hoang | H04W 74/085 |
| 2021/0250913 A1* | 8/2021 | Ganesan | H04W 76/14 |
| 2021/0258980 A1* | 8/2021 | Luo | H04W 28/0268 |
| 2021/0307032 A1* | 9/2021 | Osawa | H04W 72/569 |
| 2021/0314981 A1* | 10/2021 | Liang | H04W 72/23 |
| 2021/0345363 A1* | 11/2021 | Zhang | H04W 72/569 |
| 2021/0392618 A1* | 12/2021 | Hedayat | H04W 72/30 |
| 2022/0006569 A1* | 1/2022 | Lee | H04W 72/02 |
| 2022/0053496 A1* | 2/2022 | Yu | H04W 72/20 |
| 2023/0057486 A1* | 2/2023 | Ye | H04L 1/1896 |
| 2023/0254885 A1* | 8/2023 | Abotabl | H04L 5/14 |
| | | | 370/278 |

OTHER PUBLICATIONS

Zhang et al. U.S. Appl. No. 62/737,149, filed Sep. 27, 2018 (Year: 2018).*

Internation Searching Authority, "Written Opinion of the International Searching Authority," PCT/CN2019/071195, Sep. 23, 2019, pp. 1-4.

Fujitsu, Resource Allocation for NR V2X Sidelink Communication considering low latency requirement, 3GPP TSG RAN WG1 Meeting #94bis, R1-1810593, Oct. 8-12, 2018, pp. 1-6, Chengdu, China.

Fujitsu, Resource Allocation for NR V2X Sidelink Communication, 3GPP TSG RAN WG1 Meeting #95, R1-1812410, Nov. 12-16, 2018, pp. 1-9, Spokane, United States.

Interdigital Inc., QoS Management for NR V2X, 3GPP RAN WG2 Meeting #104, R2-1816790, Nov. 12-16, 2018, pp. 1-5, Spokane, USA.

* cited by examiner

METHOD AND APPARATUS FOR PRE-EMPTION OF A SIDELINK RESOURCE

TECHNICAL FIELD

The subject application generally relates to sidelink communication, and more specifically to method and apparatus for pre-emption of a sidelink resource.

BACKGROUND

Device-to-device (D2D) communication is expected to play a prominent role in upcoming cellular networks as it provides ultra-low latency for communication among users. Vehicle to everything (V2X) is introduced into 5G wireless communication technique. D2D is applicable to public safety and commercial communication use-cases, and also to V2X scenario.

In terms of a channel structure of D2D communication, the direct link between two user equipment (UEs) is called a sidelink (SL). Sidelink is an LTE feature introduced in 3GPP (3rd Generation Partnership Project) Release 12, and enables a direct communication between proximal UEs, and data does not need to go through a base station (BS) or core network.

When periodic traffic and aperiodic traffic (more urgent), or high-priority traffic and low-priority traffic are assigned in a shared pool, pre-emption mechanism can help the aperiodic or high-priority data transmission to obtain a SL resource in time. Pre-emption mechanism is especially useful in congested scenario or in resource fragmentation scenario (i.e. without continuous resource in frequency domain for transmission).

Therefore, it is desired to design a pre-emption mechanism to ensure the transmission of more urgent data.

SUMMARY

Some embodiments of the subject application provide a method performed by a first user equipment (UE), comprising: determining a reserved resource; transmitting a signal indicating the reserved resource; and if a pre-emption indication is received, releasing the reserved resource to a second UE.

Some embodiments of the subject application provide a method performed by a second user equipment (UE), comprising: receiving a signal indicating a reserved resource scheduled for a first UE; and transmitting a pre-emption indication to the first UE in order to pre-empt the reserved resource.

Some embodiments of the subject application provide a method performed by a base station, comprising: transmitting a first signal to request a first UE to release a first sidelink resource; wherein the first sidelink resource is to be pre-empted by a second UE with an one-shot pre-emption indication or a persistent pre-emption indication.

Some embodiments of the subject application provide a method performed by a first user equipment (UE), comprising: receiving, from a base station, a pre-emption indication to release a first sidelink resource in the set of sidelink resources; and releasing the sidelink resource.

Some embodiments of the subject application provide an apparatus, comprising: a transceiver; a processor; and a memory comprising computer program codes, wherein the memory and the computer program codes configured to, with the processor, cause the apparatus at least to perform the following method steps: determining a reserved resource; transmitting a signal indicating the reserved resource; and if a pre-emption indication is received from a second UE, releasing the reserved resource to the second UE.

BRIEF DESCRIPTION OF THE DRAWINGS

In order to describe the manner in which advantages and features of the subject application can be obtained, a description of the subject application is rendered by reference to specific embodiments thereof which are illustrated in the appended drawings. These drawings depict only example embodiments of the subject application and are not therefore to be considered as limiting of its scope.

DETAILED DESCRIPTION

The detailed description of the appended drawings is intended as a description of the currently preferred embodiments of the subject application, and is not intended to represent the only form in which the subject application may be practiced. It should be understood that the same or equivalent functions may be accomplished by different embodiments that are intended to be encompassed within the spirit and scope of the subject application.

Sidelink (SL) communication includes groupcast communication, unicast communication, or broadcast communication. UE(s) under V2X scenario may be referred to as V2X UE(s). Currently, an agreement of 3GPP RAN1 on SL communication was made for supporting several sidelink resource allocation modes for V2X sidelink communication. A sidelink transmission resource(s) may be a time resource, a frequency resource, a code resource, or a combination thereof.

In a sidelink resource allocation mode, a base station (BS) schedules resource(s) for a V2X UE within a SL communication system. In another sidelink resource allocation mode, a V2X UE determines sidelink transmission resource(s) within sidelink resources configured by base station/network or pre-configured sidelink resources.

A V2X UE which schedules sidelink transmission resource(s) may be referred to as a UE for scheduling, a scheduling UE, a scheduling V2X UE, a head UE, a head V2X UE, a source UE, a source V2X UE, or like. In order to allocate or assign resource(s), a scheduling UE may determine or select sidelink resource(s) from a resource set, a resource pool, or sidelink resource(s) that are configured or pre-configured by a BS or a network. A scheduling UE may allocate or assign specific sidelink resource(s) for sidelink groupcast communication, sidelink unicast communication, or sidelink broadcast communication.

A V2X UE, which transmits data according to sidelink resource(s) scheduled by a scheduling UE, may be referred to as a UE for transmitting, a transmitting UE, a transmitting V2X UE, a Tx UE, a V2X Tx UE, or like. A V2X UE, which receives data according to sidelink resource(s) scheduled by a scheduling UE, may be referred to as a UE for receiving, a receiving UE, a receiving V2X UE, a Rx UE, a V2X Rx UE, or like. A Tx UE and a Rx UE together may be referred to as a non-scheduling UE, a non-scheduling V2X UE, or like.

Embodiments of the subject application may be provided in a network architecture that adopt various service scenarios, for example but is not limited to, 3GPP 5G NR (new radio), 3GPP LTE (Long Term Evolution) Release 12 and onwards, etc.

Figure 1:
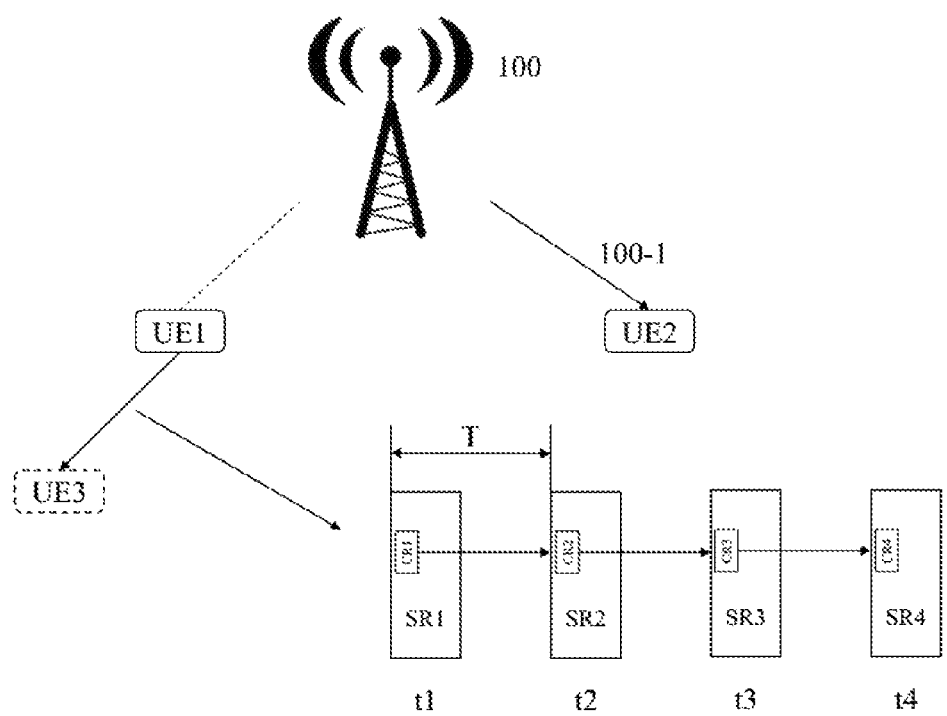
FIG. 1 illustrates an exemplary sidelink communication system in accordance with some embodiments of the subject application.

FIG. 1 illustrates an exemplary sidelink communication system according to some embodiments of the subject application. Referring to FIG. 1, the reference numeral 100 represents a base station; and the reference numeral 100-1 represents the downlink signal from the base station 100 to the UE2. UE1 is a pre-empted UE with less urgent traffic and UE2 is a pre-emption UE which intends to transmit more urgent traffic.

UE1 determines a set of sidelink resources based on sensing (e.g., SR1, SR2, SR3, and SR4 in FIG. 1), where the transmission interval is T. For example, T may be 50 ms, which means that the interval between timeslot t1 and timeslot t2 is 50 ms. Alternatively, the base station 100 may schedule the set of sidelink resources for UE1. UE1 then transmits data as well as the control information on the set of available sidelink resources. As shown in FIG. 1, the sidelink resource SR1 at the timeslot t1 is used to transmit the data of UE1, Control Resource (CR1) in the sidelink resource SR1 is used to transmit control information, such as Sidelink Control Information (SCI).

Figure 2:
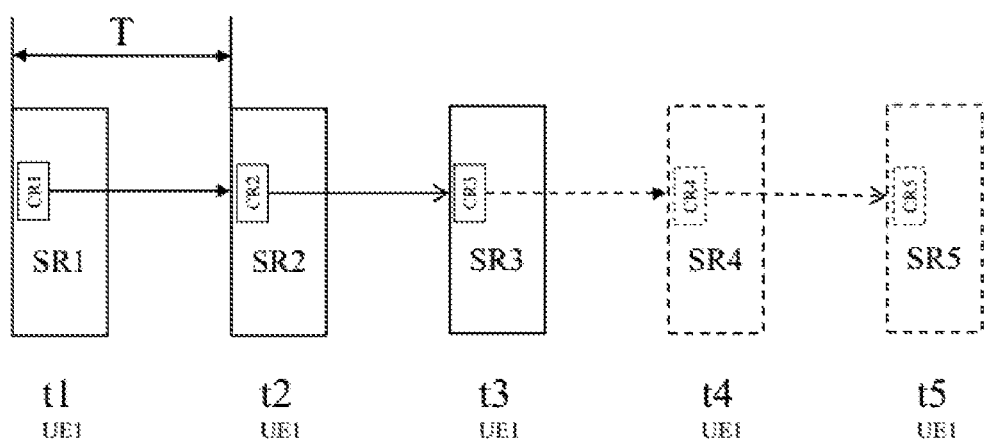
FIG. 2 illustrates a stage during pre-emption of sidelink resource according to some embodiments of the subject application.

FIG. 2 illustrates a stage during pre-emption of sidelink resource according to some embodiments of the subject application. In this stage, UE1 indicates in the signal transmitted on each CR that the next available sidelink resource SR is reserved and can be pre-empted by another UE. In detail, UE1 transmits data on the sidelink resource SR1 at the timeslot t1, and indicates, in signal transmitted on control resource CR1, a time and/or frequency location of the next reserved resource for pre-emption; if not pre-emption indication is received, UE1 then transmits data on the sidelink resource SR2 at the timeslot t2, and indicates, in signal transmitted on control resource CR2, a time and/or frequency location of the next reserved resource, and so on. That is, in FIG. 2, each CR may carry a reservation indication indicating the next reserved resource. According some embodiments, the pre-emption indication may include the ID of a UE, which plans to pre-empt the reserved resource, and the priority level of data to be transmitted by the UE. According to the present disclosure, the reservation indication may be included in SCI or data transmission, and thus may be transmitted in a Physical Sidelink Control Channel (PSSCH), a Physical Sidelink Shared Channel (PSSCH) or a Physical Sidelink Feedback Channel (PSFCH).

Figure 3:
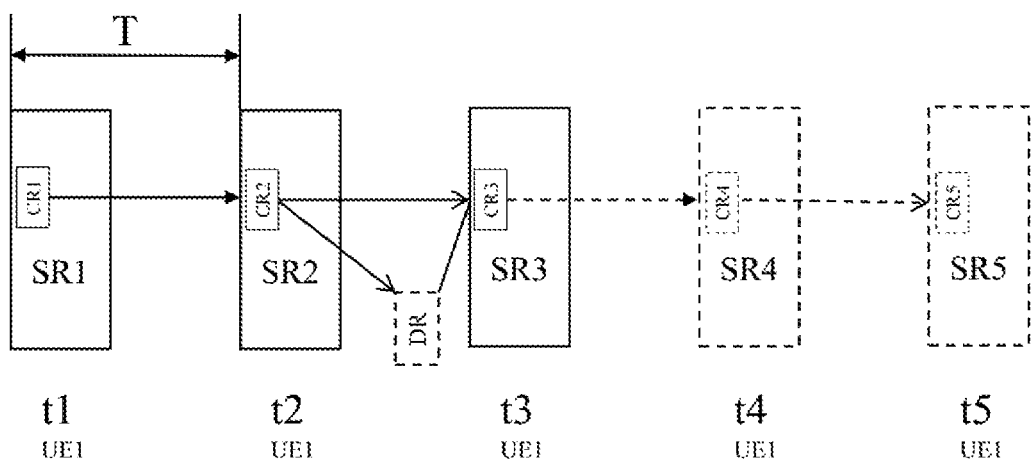
FIG. 3 illustrates a stage during pre-emption of sidelink resource according to some embodiments of the subject application.

FIG. 3 illustrates a stage during pre-emption of sidelink resource according to some embodiments of the subject application. In this stage, a detecting resource DR is indicated by the signal transmitted on control resource CR2. In some preferred embodiments, a detecting resource is defined for a pre-empted UE (such as UE1) to monitor the pre-emption indication transmitted from pre-emption UE (such as UE2). If the timeslot receiving the pre-emption indication was a transmitting timeslot for UE1, UE1 may miss the pre-emption indication from UE2. Since a detecting resource has been arranged for receiving the pre-emption indication, UE1 would not transmit data or control information on that detecting resource and thus would not miss the pre-emption indication from UE2.

As shown in FIG. 3, the control resource (for example, CR1, CR2, CR3, CR4, and CR5) may be used to transmit a signal indicating the time/frequency location of a detecting resource. Alternatively, the control resource may be used to transmit a signal indicating the offset between the reserved resource and detecting resource. For example, CR2 is used to transmit a signal indicating the offset between the reserved resource and DR. The offset may be a number of timeslots, a number of symbols and a number of frequency units. If the offset is a number of timeslots, the pre-emption indication from UE2 can be a Sidelink Control Information (SCI) or a field included in Sidelink Control Information (SCI) or a Sidelink Feedback Control Information (SFCI) or a field included in Sidelink Feedback Control Information (SFCI), and transmitted in the detecting resource. If the offset is a number of symbols, the pre-emption indication can be a sequence-based indicator and transmitted in one symbol of timeslot. The offset may also be a number of frequency units. The offset may include both time offset and frequency offset. In some other embodiments, these offsets, namely, time offset or frequency offset can be fixed, configured, or preconfigured. If both the time offset and frequency offset are preconfigured, the location of a detecting resource can be determined once a reserve resource is indicated.

Figure 4:
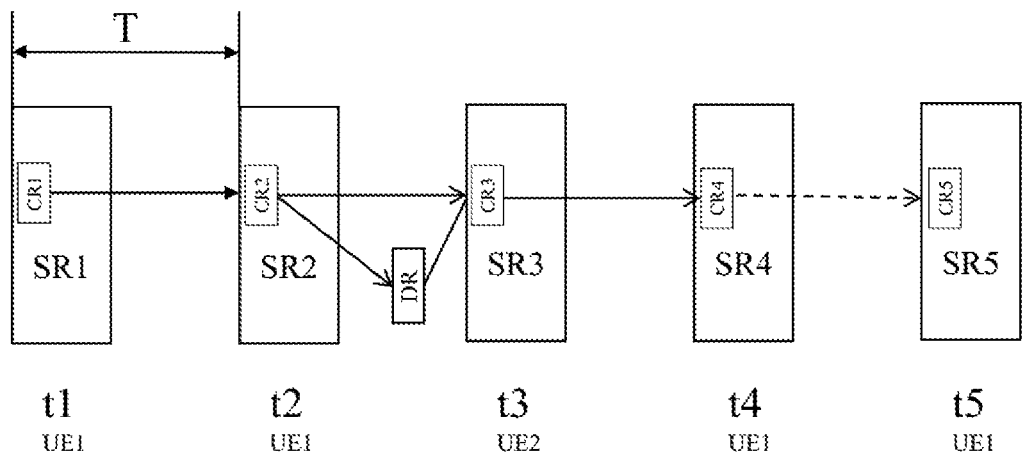
FIG. 4 illustrates a stage during pre-emption of sidelink resource according to some embodiments of the subject application.

FIG. 4 illustrates a stage during pre-emption of sidelink resource according to some embodiments of the subject application. In this stage, UE2 has more urgent data to transmit and wants to use the reserved resource of UE1, it determines the detecting resource based on the signal received on control resource CR2, and sends the pre-emption indication on the determined detecting resource DR before timeslot t3. The pre-emption indication may include an indicator indicating that the pre-emption is a one-shot pre-emption or a persistent pre-emption.

In FIG. 4, the pre-emption indication indicates a one-shot pre-emption, which informs that UE2 would only use one reserved resource of UE1 (e.g., SR3). That is, UE1 can still transmit data or control information on SR4.

Figure 5:
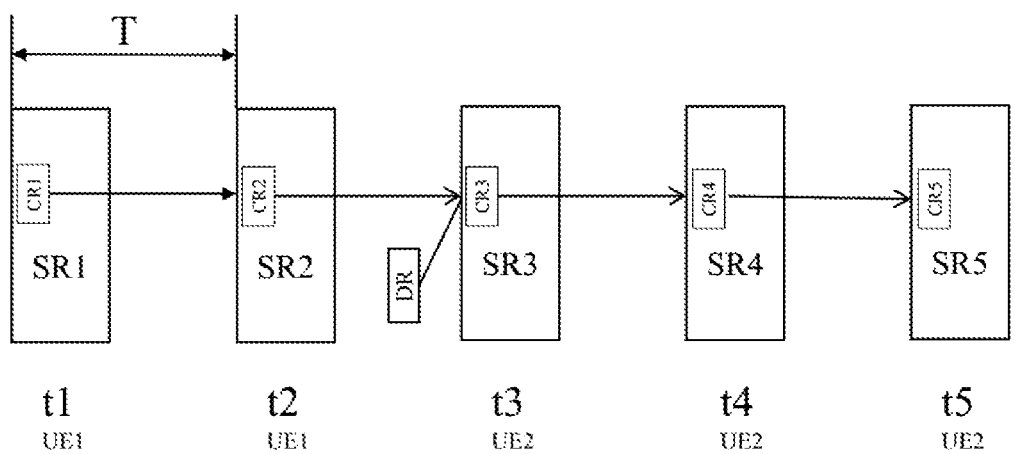
FIG. 5 illustrates a stage during pre-emption of sidelink resource according to some embodiments of the subject application.

In FIG. 5, the pre-emption indication from UE2 indicates a persistent pre-emption, which informs that UE2 would use all of the rest of the resources UE1 intends to use (e.g., SR3, SR4, SR5). After receiving the persistent pre-emption on the detecting resource DR, UE1 triggers a resource reselection. It means that UE1 will sense other resources to transmit remaining data or send a request, to the base station, for resources to transmit remaining data.

According to the present disclosure, the one shot pre-emption indication may be represented with "0", and persistent pre-emption indication may be represented with "1;" similarly, one shot pre-emption indication may be represented with "1", and persistent pre-emption indication may be represented with "0."

Figure 6:
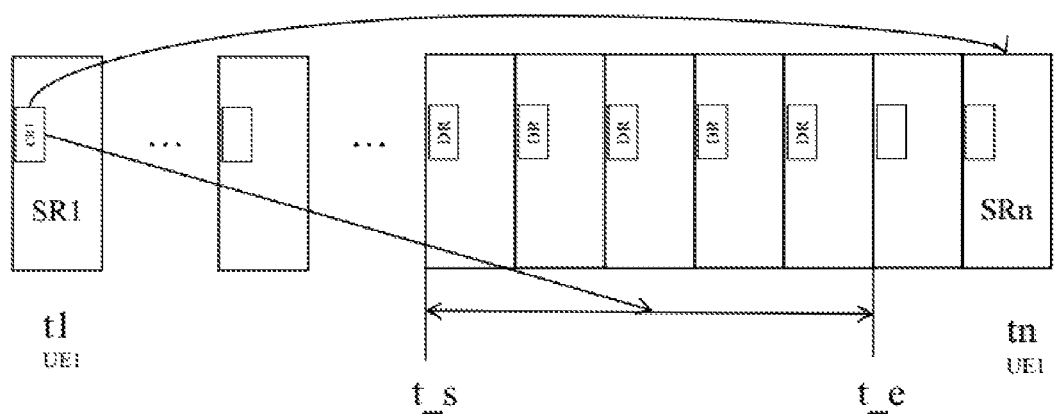
FIG. 6 illustrates pre-emption of sidelink resource according to another some embodiments of the subject application.

FIG. 6 illustrates pre-emption of sidelink resource according to another some embodiments of the subject application. In this embodiment, the signal transmitted on control resource CR1 in the sidelink resource SR1 indicates the reserved resource at the timeslot tn as well as a detecting resource window from a starting timeslot t_s to an end timeslot t_e which includes 5 timeslots. The window may include other number of timeslots. The signal may include a time window indicator, which indicates the starting timeslot t_s and the end timeslot t_e. Alternatively, the time window indicator may indicate a starting timeslot and a number timeslots in the window. Alternatively, the time window indicator may indicate number timeslots in the windows (i.e., detecting window size). In some embodiments, the time offset between starting timeslot t_s and tn, or the time offset between end timeslot t_e and tn may be fixed, configured, or preconfigured. Alternatively, the end timeslot could be fixed, such as the previous timeslot of the reserved sidelink resource SRn, or the fixed end timeslot could be tn-2 considering UE's processing time.

Figure 7:
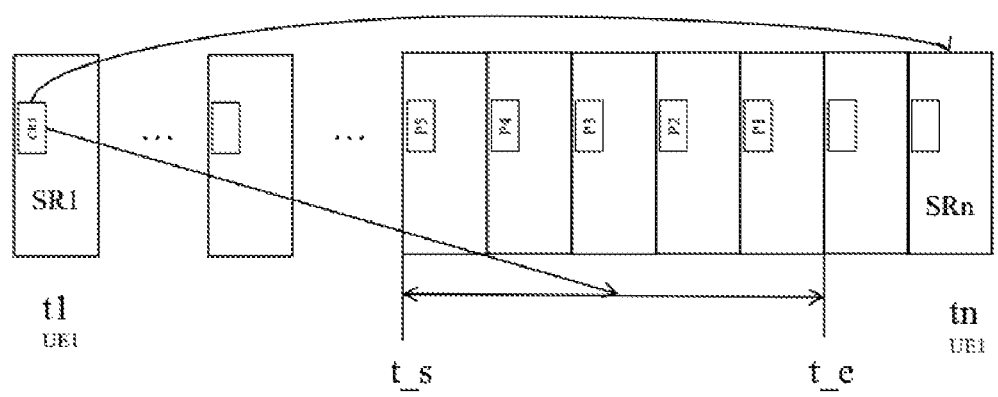
FIG. 7 illustrates pre-emption of sidelink resource according to yet another some embodiments of the subject application.

FIG. 7 illustrates pre-emption of sidelink resource according to yet another some embodiments of the subject application. In FIG. 7, there may be multiple pre-emption UEs (UE2) receiving the signal transmitted on control resource CR1. Therefore, each of those UE2 would transmit the pre-emption indication in the detecting window. Considering the multiple detecting resources, each UE2 could randomly select a timeslot from the available transmission timeslots in the detecting window, or they could select a timeslot based on a pre-configured/pre-defined rule. If there is no pre-emption indication or no pre-emption indication with higher priority level is detected by one of those UE2, then this UE2 can transmit data on the reserved resource of UE1.

For example, the rule may be associated with QoS level, latency requirements or other priority level of the data to be transmitted by those UE2. In the embodiment of FIG. 7, a pre-emption indication with the priority level P5 is to be transmitted in tn-6; a pre-emption indication with the priority level P4 is to be transmitted in tn-5; a pre-emption indication with the priority level P3 is to be transmitted in tn-4; a pre-emption indication with the priority level P2 is to be transmitted in tn-3; and a pre-emption indication with the priority level P1 is to be transmitted in tn-2. The priority order may be: P1>P2>P3>P4>P5. If a UE2 intends to transmit data with the priority level P2, it transmits the pre-emption indication at the timeslot tn-3, and detects whether there is a pre-emption indication on the timeslot for higher priority level (namely, P1) than P2. If there is no pre-emption indication is detected by UE2 on the timeslot for higher priority level, then UE2 can transmit data on the reserved resource of UE1.

Figure 8:
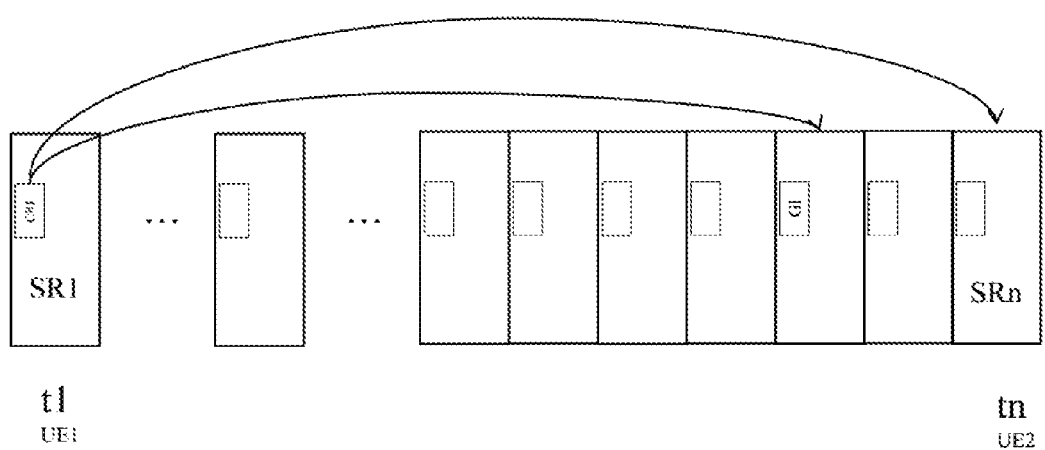
FIG. 8 illustrates pre-emption of sidelink resource according to yet another some embodiments of the subject application.

FIG. 8 illustrates pre-emption of sidelink resource according to yet another some embodiments of the subject application. In this embodiment, the signal transmitted the control resource indicates a time/frequency location of a grant resource. Alternatively, the time and/or frequency location of the grant resource may be indicated by an offset with respect to a time and/or frequency location of the reserved resource. The offset may be a number of timeslots, a number of symbols and a number of frequency units. If the offset is a number of timeslots, the pre-emption indication from UE2 can be a Sidelink Control Information (SCI) or a field included in Sidelink Control Information (SCI) or a Sidelink Feedback Control Information (SFCI) or a field included in Sidelink Feedback Control Information (SFCI), and transmitted in the detecting resource. If the offset is a number of symbols, the pre-emption indication can be a sequence-based indicator and transmitted in one symbol of timeslot. The offset may also be a number of frequency units. The offset may include both time offset and frequency offset. In some other embodiments, these offsets, namely, time offset or frequency offset can be fixed, configured, or preconfigured. If both the time offset and frequency offset are pre-configured, the location of a grant resource can be determined once a reserve resource is indicated.

If multiple UE2 want to use the reserved resource of UE1, they may transmit pre-emption indications in a randomly selected timeslots before the grant resource. After detecting the pre-emption indications, UE1 may determine to release the reserved sidelink resource to a certain UE2, and transmit the Grant indication (GI) on the grant resource. The grant indication includes the UE1's ID and the ID of selected UE2. Each UE2 would listen the grant indication on the indicated grant resource, and aware whether it can use the reserved resource. Since the grant indication would be issued, it is not necessary for UE1 to indicate a detecting resource or a detecting window. Nevertheless, it is still feasible to indicate both detecting resource and grant resource for implement the resource pre-emption.

According to the present disclosure, the detecting resource, the grant resource and/or the reserved resource could be determined by UE1 or a base station. In some embodiment, the time/frequency location of detecting resource, the time/frequency location of grant resource and/or time/frequency location of the reserved resource, and/or their time/frequency relative location could be fixed, configured, or preconfigured. For example, if the reserve resource is determined by UE 1, the offset between the reserve resource and the detecting resource could be fixed, configured, or preconfigured; or if the reserve resource is determined by UE 1, the offset between the reserve resource and the grant resource could be fixed, configured, or preconfigured.

Figure 9:
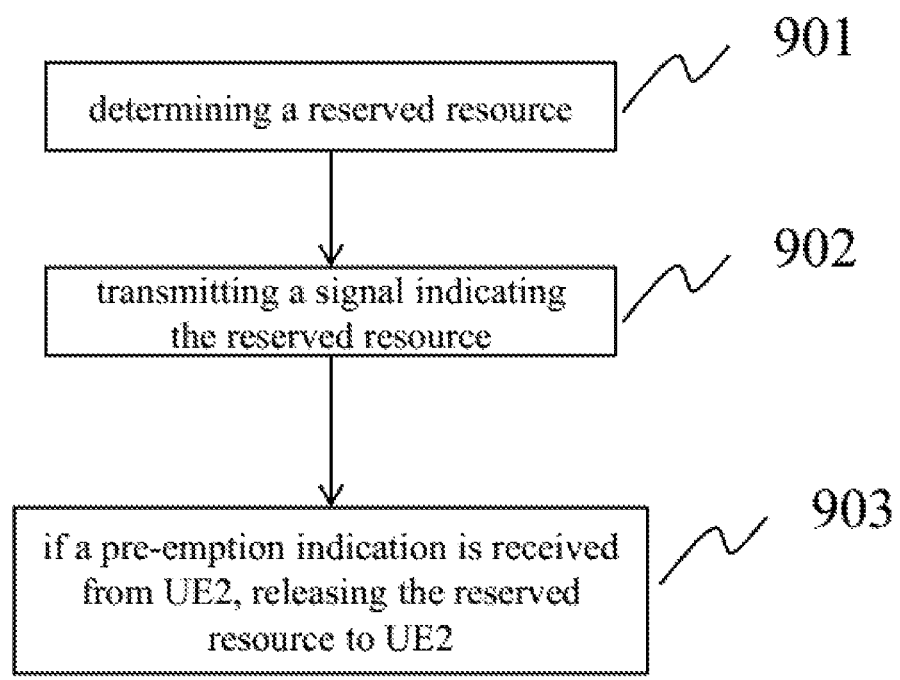
FIG. 9 illustrates a method performed by UE1 according to some embodiments of the subject application.

FIG. 9 illustrates a method performed by the pre-empted UE (UE1) according to some embodiments of the subject application. In step 901, UE1 determines a reserved resource, in step 902, UE1 transmits a signal indicating the reserved resource. The signal may be transmitted in the control resource as depicted in FIGS. 1-8. In step 903, UE1 detects whether UE2 transmits a pre-emption indication to UE1. If the pre-emption indication from UE2 is received, UE1 releases the reserved resource to UE2.

The signal may indicate a detecting resource for receiving the pre-emption indication from UE2. For example, the detecting resource DR as depicted in FIGS. 4, 5, and 6. The time and/or frequency location of the detecting resource is indicated by an offset with respect to a time and/or frequency location of the reserved resource. That is, the offset may be a number of timeslots, a number of symbols and a number of frequency units.

According to some embodiments of the present disclosure, the method of FIG. 9 further comprises transmitting grant indication indicating that the reserved resource is pre-empted by which UE. The signal transmitted by UE1 may further indicate a grant resource for transmitting the grant indication. A time and/or frequency location of the grant resource is indicated by an offset with respect to a time and/or frequency location of the reserved resource. The grant indication includes an UE1's ID and an UE2's ID. If the grant indication is provided, UE1 may or may not indicate the detecting resource mentioned above.

As explained in the content regarding FIGS. 4, and 5, the pre-emption may be a one-shot pre-emption or a persistent pre-emption, and correspondingly, the pre-emption indication includes an indicator indicating that the pre-emption is a one-shot pre-emption or a persistent pre-emption.

If the pre-emption is a persistent pre-emption, the method of FIG. 8 may further comprises triggering a resource reselection since the resources UE1 intends to use are all occupied by UE2.

According to some embodiments of the present disclosure, the pre-emption indication may be transmitted in a Physical Sidelink Control Channel (PSCCH), a Physical Sidelink Shared Channel (PSSCH) or a Physical Sidelink Feedback Channel (PSFCH).

Figure 10:
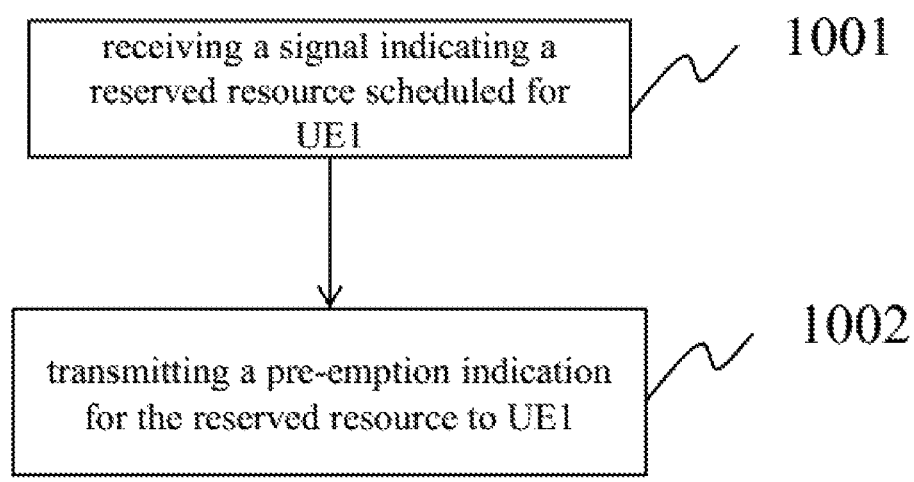
FIG. 10 illustrates a method performed by UE2 according to some embodiments of the subject application.

FIG. 10 illustrates a method performed by the pre-emption UE (UE2) according to some embodiments of the subject application. In step 1001, UE2 receives a signal, for example, on control resource, indicating a reserved resource scheduled for UE1. In step 1002, UE2 transmits a pre-emption indication for the reserved resource to UE1. The signal may indicate a detecting resource of UE1 for receiving the pre-emption indication from UE2. The detecting resource and/or the reserved resource scheduled for the UE1 is received from UE1, from a base station or (pre)configured by the base station. The pre-emption indication may include the ID of UE2 and the priority level of data to be transmitted by UE2.

As explained in the content regarding FIGS. 6, and 7, the detecting resource may include a detecting resource window, that is, the detecting resource includes a plurality of timeslots arranged in sequence. UE2 may transmit the pre-emption indication on a randomly selected one of the plurality of timeslots in the detecting resource window. Alternatively, each of the plurality of timeslots corresponds to a priority level, and UE2 determines the priority level of the data to be transmitted on the reserved resource, then transmit a pre-emption indication on the detecting resource comprises transmitting the pre-emption indication on one of the plurality of timeslots based on the priority level.

According to some embodiments of the present disclosure, the method of FIG. 10 further comprises listening on the timeslots which correspond to higher priority level than that of the data to be transmitted by itself; and if there is no other pre-emption indication with higher priority level is detected on the timeslots, transmitting the data on the reserved resource.

According to some other embodiments of the present disclosure, the method of FIG. 10 further comprise transmitting on the reserved resource if a grant indication for UE2 is received.

In some embodiments, UE2 transmits the pre-emption indication based on a sidelink grant from the base station.

Figure 11:
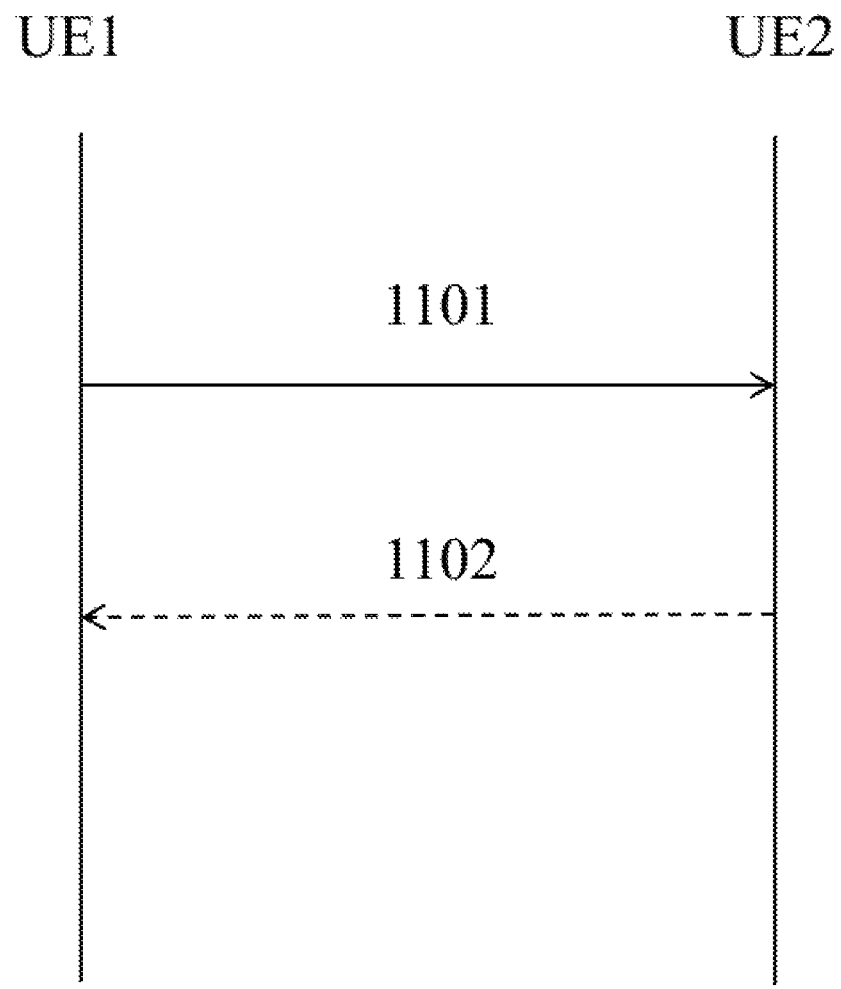
FIG. 11 illustrates a flow chart of the sidelink communication between UE1 and UE2 according to some embodiments of the subject application.

FIG. 11 illustrates a flow chart of the sidelink communication according to some embodiments of the subject application. From the perspective of UE1, UE1 first determines a reserved resource, and transmits a signal indicating the reserved resource in step 1101. The signal may be transmitted on the control resource as depicted in FIGS. 1-8. In step 1102, UE1 detects whether UE2 transmits a pre-emption indication to UE1. If the pre-emption indication from UE2 is detected, UE1 releases the reserved resource to the second UE.

From the perspective of UE2, UE2 first receives a signal indicating the reserved resource from UE1 in step 1101. If UE2 has more urgent data to transmit, in step 1102, UE2 transmits a pre-emption indication for the reserved resource to UE1.

Figure 12:
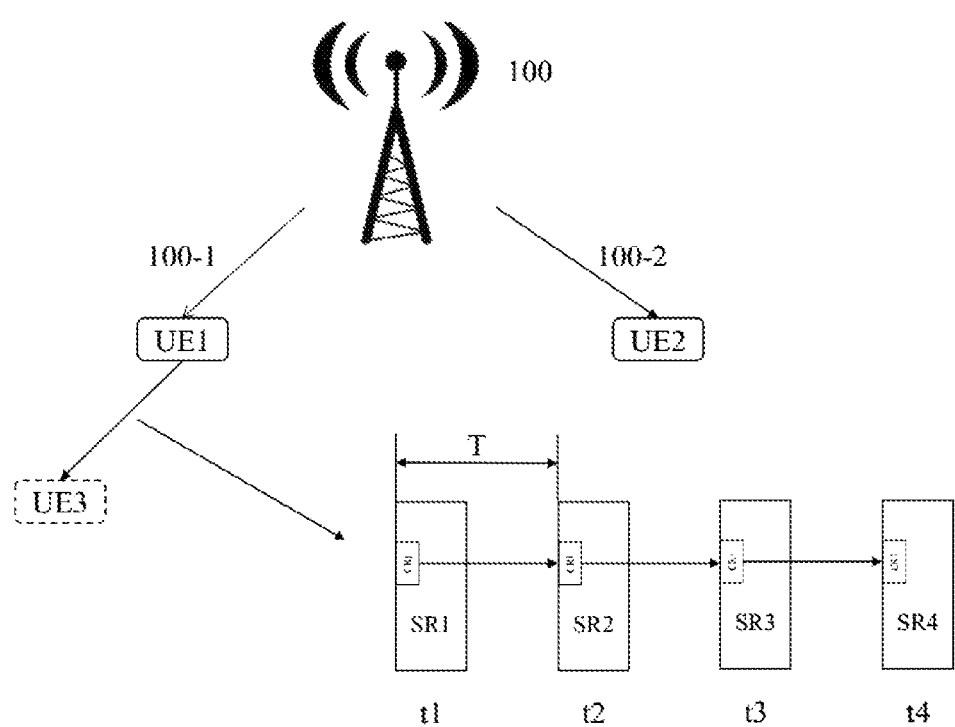
FIG. 12 illustrates an embodiment of a sidelink communication among the base station, UE1 and UE2 according to some embodiments of the subject application.

FIG. 12 illustrates an embodiment of a sidelink communication among the base station, the pre-empted UE (UE1) and the pre-emption UE (UE2) according to some embodiments of the subject application. In some embodiments, the base station schedules the sidelink resources to be used by UE for sidelink transmission. In some other embodiments, UE1 determines sidelink resource for transmission based on sensing.

In FIG. 12, UE1 has a set of resources for sidelink transmissions by the base station. The pre-emption UE, UE2 has more urgent data to transmit. The base station transmits a signal to UE1, which indicates UE1 to release or drop one or more sidelink resources. The base station also transmits a signal to UE2 indicating that the one or more sidelink resources are pre-empted by UE2. After receiving the signal 100-1 from the base station, UE1 releases or drops the one or more sidelink resources, and UE2 performs transmission on the one or more sidelink resources.

The above signals may be downlink control information (DCI) signal. DCI could be UE-specific. In that case, if there are multiple UEs, multiple DCIs are required. Alternatively, the DCI may be common or group-specific.

Figure 13:
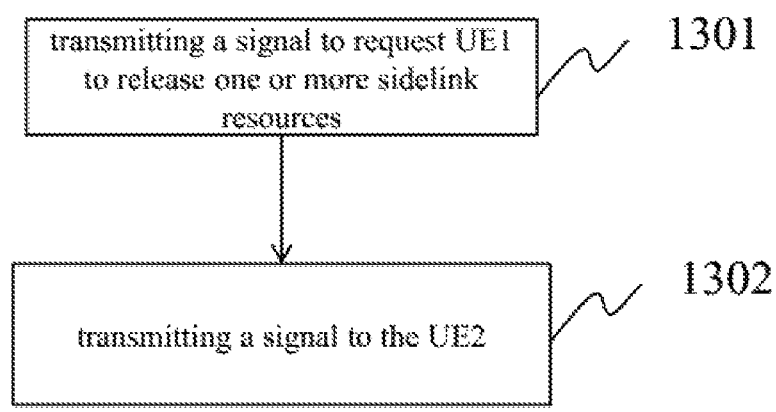
FIG. 13 illustrates a method performed by a base station according to some embodiments of the subject application.

FIG. 13 illustrates a method performed by a base station according to some embodiments of the subject application. In step 1301, the base station transmits a signal to indicate UE1 to release one or more sidelink resources. In step 1302, the base station transmits a signal to UE2 indicating that the one or more sidelink resources are pre-empted by the UE2. In some embodiments, step 1302 comprises transmitting a signal to UE2 for scheduling a sidelink transmission. Thus, UE2 may transmit a pre-emption indication to UE1 on the scheduled sidelink.

Figure 14:
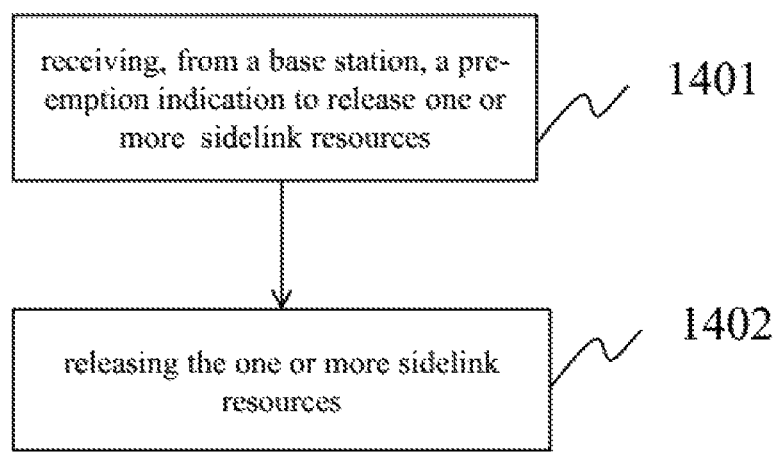
FIG. 14 illustrates a method performed by UE1 according to some embodiments of the subject application.

FIG. 14 illustrates a method performed by a pre-empted UE (UE1) according to some embodiments of the subject application. In step 1401, UE1 receives a DCI signal, for example, a pre-emption indication, from a base station, to release a first sidelink resource in the set of sidelink resources. Alternatively, UE1 receives Sidelink Control Information (SCI), for example, a pre-emption indication, from UE2, to release a first sidelink resource in the set of sidelink resources. In step 1402, UE1 releases the sidelink resource.

Figure 15:
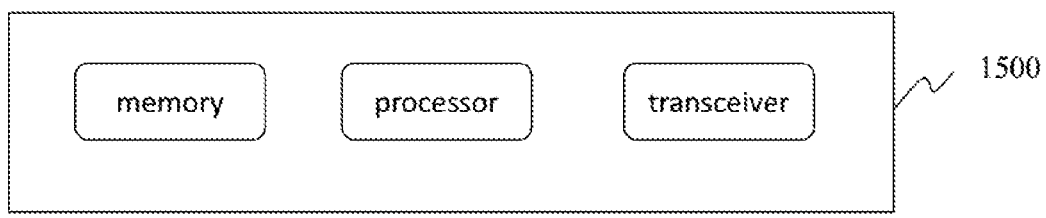
FIG. 15 illustrates a block diagram of an apparatus according to some embodiments of the subject application.

FIG. 15 illustrates a block diagram of an exemplary apparatus in accordance with some embodiments of the subject application. Referring to FIG. 15, the apparatus 1500 include a transceiver, a processor, and a memory. The apparatus 1500 may be a UE or a base station mentioned above, or other device that supports sidelink transmission.

The method of the subject application can be implemented on the processor by performing computer program codes stored in the memory. However, the apparatus may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the subject application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a first user equipment (UE), the method comprising:
    determining a reserved sidelink resource;
    transmitting a signal to a second UE, the signal indicating:
        the reserved sidelink resource;
        a detecting resource for receiving a pre-emption indication;
        a time and/or frequency location of the detecting resource, wherein the signal indicates the time and/or frequency location of the detecting resource by an offset with respect to a time and/or frequency location of the reserved sidelink resource; and
        a grant resource for transmitting a grant indication, wherein the signal indicates a time and/or frequency location of the grant resource by an offset with respect to the time and/or frequency location of the reserved sidelink resource; and
    in response to the pre-emption indication being received from the second UE:
        transmitting the grant indication indicating the reserved sidelink resource is pre-empted by the second UE; and
        releasing the reserved sidelink resource to the second UE.

2. The method of claim 1, wherein the offset relates at least one of a number of timeslots, a number of symbols, and a number of frequency units.

3. The method of claim 1, wherein the pre-emption indication includes an indicator indicating that the pre-emption indication is a one-shot pre-emption indication or a persistent pre-emption indication.

4. The method of claim 3, further comprising triggering a resource reselection if the persistent pre-emption indication is received.

5. The method of claim 3, wherein the reserved sidelink resource comprises a first resource of a plurality of resources and the method further comprises transmitting data on a second resource of the plurality of resources if the pre-emption indication is received and the pre-emption indication is a one-shot preemption indication.

6. The method of claim 1, wherein the detecting resource comprises a plurality of timeslots arranged in sequence.

7. The method of claim 6, wherein the plurality of timeslots are indicated by the signal with a starting timeslot and a number of the plurality of timeslots.

8. The method of claim 6, wherein the plurality of timeslots are indicated by the signal with a starting timeslot and an end timeslot.

9. The method of claim 1, wherein the grant indication includes an identity information of the first user equipment and an identity information of the second UE.

10. The method of claim 1, wherein the pre-emption indication is transmitted in a physical sidelink control channel, a physical sidelink shared channel or a physical sidelink feedback channel.

11. The method of claim 1, wherein the pre-emption indication includes an identity of the second UE and a priority level of data to be transmitted by the second UE.

12. The method of claim 1, wherein the pre-emption indication is part of a sidelink control information (SCI).

13. A method performed by a second user equipment (UE), the method comprising:
    receiving, from a first UE, a signal, the signal indicating:
        a reserved sidelink resource scheduled for the first UE;
        a detecting resource for receiving a pre-emption indication;
        a time and/or frequency location of the detecting resource, wherein the signal indicates the time and/or frequency location of the detecting resource by an offset with respect to a time and/or frequency location of the reserved sidelink resource; and
        a grant resource for transmitting a grant indication, wherein the signal indicates a time and/or frequency location of the grant resource by an offset with respect to the time and/or frequency location of the reserved sidelink resource;
    transmitting the pre-emption indication to the first UE to preempt the reserved sidelink resource; and
    receiving the grant indication indicating the reserved sidelink resource is preempted by the second UE.

14. The method of claim 13, wherein the offset relates at least one of a number of timeslots, a number of symbols, and a number of frequency unit.

15. The method of claim 13, wherein the pre-emption indication includes an indicator indicating that the pre-emption indication is a one-shot pre-emption indication or a persistent pre-emption indication.

16. The method of claim 13, wherein the detecting resource comprises a plurality of timeslots arranged in sequence.

17. A first user equipment (UE), comprising:
at least one memory; and
at least one processor coupled with the at least one memory and configured to cause the first UE to:
  determine a reserved sidelink resource;
  transmit a signal to a second UE, the signal indicating:
    the reserved sidelink resource;
    a detecting resource for receiving a pre-emption indication;
    a time and/or frequency location of the detecting resource, wherein the signal indicates the time and/or frequency location of the detecting resource by an offset with respect to a time and/or frequency location of the reserved sidelink resource; and
    a grant resource for transmitting a grant indication, wherein the signal indicates a time and/or frequency location of the grant resource by an offset with respect to the time and/or frequency location of the reserved sidelink resource; and
  in response to the pre-emption indication being received from the second UE:
    transmit the grant indication indicating the reserved sidelink resource is pre-empted by the second UE; and
    release the reserved sidelink resource to the second UE.

18. A second user equipment (UE), comprising:
at least one memory; and
at least one processor coupled with the at least one memory and configured to cause the second UE to:
  receive, from a first UE, a signal, the signal indicating:
    a reserved sidelink resource scheduled for the first UE;
    a detecting resource for receiving a pre-emption indication;
    a time and/or frequency location of the detecting resource, wherein the signal indicates the time and/or frequency location of the detecting resource by an offset with respect to a time and/or frequency location of the reserved sidelink resource; and
    a grant resource for transmitting a grant indication, wherein the signal indicates a time and/or frequency location of the grant resource by an offset with respect to the time and/or frequency location of the reserved sidelink resource;
  transmit the pre-emption indication to the first UE to preempt the reserved sidelink resource; and
  receiving the grant indication indicating the reserved sidelink resource is pre-empted by the second UE.

* * * * *